Figure 1:
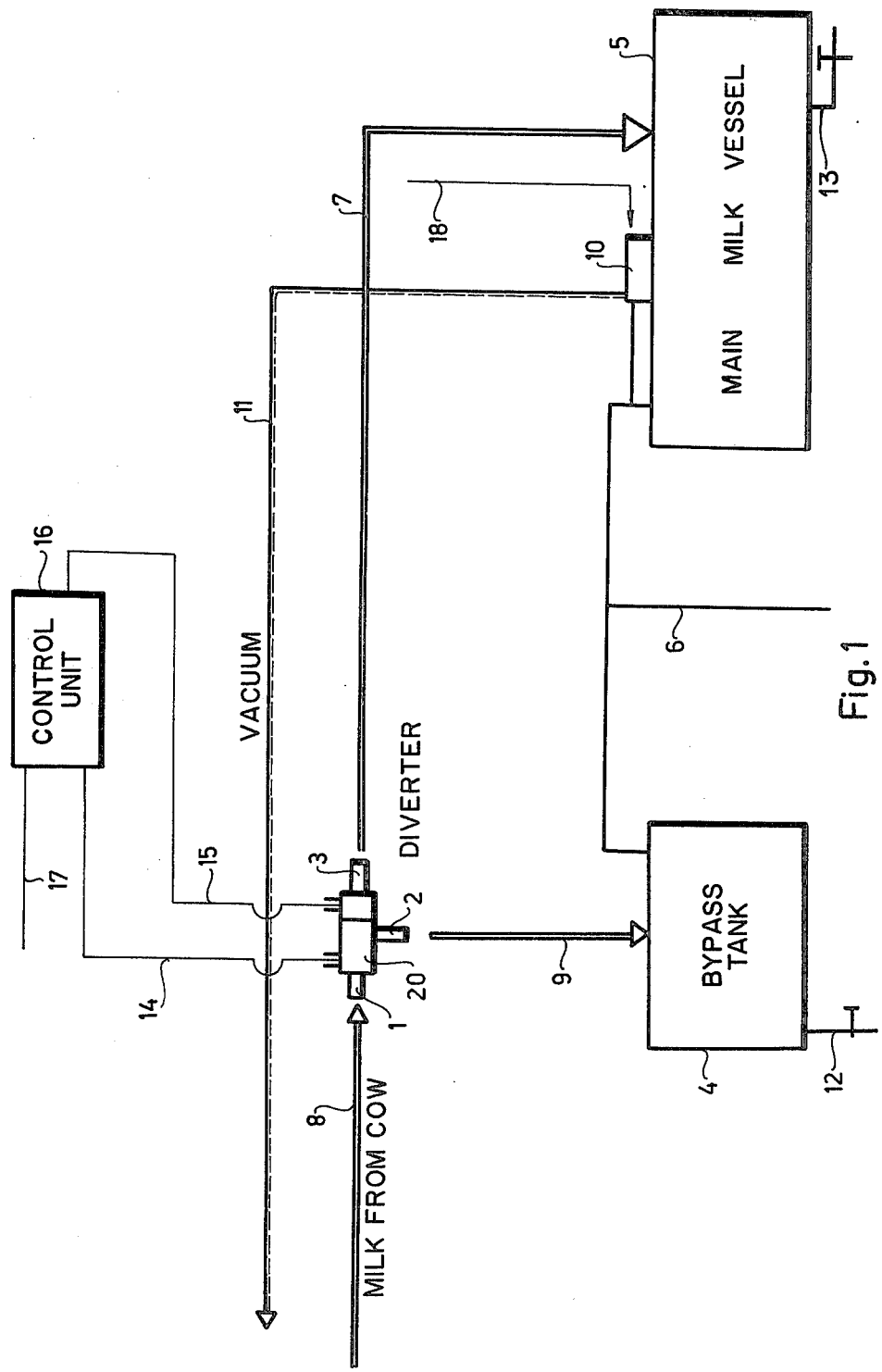

United States Patent [19]

Tamás et al.

[11] 4,190,020
[45] Feb. 26, 1980

[54] PROCESS AND EQUIPMENT FOR MACHINE MILKING TO PROVIDE STERILE MILK FREE FROM BLOOD AND PUS

[75] Inventors: Károly Tamás, Kalocsa; Ferenc Vörös, Kaposvár; Ilona Bedö Budapest, all of Hungary

[73] Assignee: Mezogazdasagi Foiskola, Kaposvar, Denesmajor, Hungary

[21] Appl. No.: 866,783

[22] Filed: Jan. 3, 1978

[51] Int. Cl.² .............................................. A01J 7/00
[52] U.S. Cl. ................................ 119/14.08; 119/14.14
[58] Field of Search ............... 119/14.14, 14.15, 14.08; 250/200, 573, 226; 209/511; 356/173, 181

[56] References Cited

U.S. PATENT DOCUMENTS

| 3,566,841 | 3/1971 | Gerrish et al. | 119/14.15 |
| 3,603,458 | 9/1971 | Bliss | 209/511 |
| 3,992,109 | 11/1976 | Bock | 250/573 |

*Primary Examiner*—Hugh R. Chamblee
*Attorney, Agent, or Firm*—Young & Thompson

[57] ABSTRACT

Cows are milked by automatic machinery, by diverting the milk initially flowing, to a bypass tank, for a predetermined period of time. The milk is then diverted to a main vessel, to which it flows throughout the milking cycle unless the color of the milk changes as determined colorimetrically, in which case flow of milk is switched back to the bypass tank. Change of color is indicative of the presence of blood or pus in the milk.

6 Claims, 2 Drawing Figures

PROCESS AND EQUIPMENT FOR MACHINE MILKING TO PROVIDE STERILE MILK FREE FROM BLOOD AND PUS

The subject of this invention is a process and equipment insuring sterile milk free from blood and pus during machine milking.

Specialists engaged in keeping and breeding horned cattle have long been aware that the first jets of milk, at the start of milking, contain far more microbes than the milk gained during the later phase of milking, the reason being the formation of a bacteria stopper in the nipple channel, and the first squirts from the udder take these with themselves.

During manual milking the first squirts of milk were aimed at the ground and only then was the milk flowed into the milking vessel. It was customary, even in the case of individually applied machine milking, to milk the first milk-squirts manually, and to let the milk gained in this way flow onto the ground or into a separate vessel and only then were the milking cups fitted onto the udder teats i.e. machine milking was only begun afterwards.

Along with development of large-scale livestock-breeding and intense mechanization, the conditions of machine-milking changed simultaneously in a way making impossible segregation of the first squirts of milk on the one hand as result of cups the number of employed, on the other hand due to mechanical construction of the known equipment. Consequently extreme infection of the mixed-milk obtained by machine milking has to be accounted for in large dairy operations.

The bad quality, from a bacterial point of view, of the mixture-milk gained by machine milking is only worsened by the circumstance that Coli-bacteria get into the milk with the first milK-squirts. Regarding degree of infection of the mixture-milk collected by machine milking some idea is formed from the datum observed during our tests wherein the total germ count in the mixture milk often exceeds the quantity of even 100 million germs/ml.

It can be stated at the same time that by segregating the first few squirts of milk, the total germ count can be reduced by approximately 70%. Beside this there exists the great advantage of not getting any Coli-bacteria in milk used for human consumption.

The quality of mixture-milk gained by machine milking is lessened by bloody and purulent milk also, occurring rather frequently due to disease of some horned cattle or other reasons. So far no stop could be put to such milk getting into the collecting vessel during machine milking.

The object of this invention is to segregate during the process of machine milking both the first squirts of milk appearing at the start of milking and the bloody and/or purulent milk occurring during machine milking, and to make collection of such milk possible in a by-tank independent of the main vessel gathering mixture-milk for human consumption.

It was ascertained during tests that taking wide variations into consideration, depending on the individual characteristics of animals—such as age, lactation number, udder shape, milk giving ability, etc.—the quantity of the first squirts of milk to be separated is 200–250 ml. per milking and per animal. Accordingly—in compliance with the invention—the milk is let into a by-tank for 3 to 10 seconds suitably 4.5 to 7.5 seconds after start of machine-milking, after which it is flown into the main vessel. If the mentioned length of time is to be determined by the number of pulses, it can be said that during 2 to 8 pulses, suitably 3 to 5 pulses after start of machine-milking the milk is led into a by-tank and only after this is it flown into a main vessel.

To separate bloody and/or purulent milk independent of the length of time, such milk is flown into a by-tank right until the blood and pus respectively in the milk cease to be present.

It is very important that the initial squirts of milk, furthermore the bloody and purulent milk, be segregated during the process of machine-milking, i.e. not before and without intermission of the machine-milking. Segregation of the initial squirts of milk is carried out according to predetermined duration or determined by a unit of time or within a certain number of pulses, while segregation of bloody, and purulent milk respectively is accomplished on the basis of its colour.

Therefore the essence of the invention is to direct the milk flow for a determined length of time after starting machine milking and/or the milk flow containing blood and pus respectively appearing during the milking process into a by-tank and subsequently maintaining the machine milking, the milk is led into a main vessel.

According to one aspect of the invention, the milk is conveyed into a by-tank during 3 to 10 secs after starting of machine milking.

According to another aspect milk is conducted into a by-tank during 2 to 8 pulses after start of machine milking.

In order to separate bloody and purulent milk the colour of milk flowing in the milk-line starting from the collector of the milking machine is continuously checked and the milk current is directed to a by-tank in case of any change in colour due to blood or pus, then after the original colour of the milk returns, the direction of milk-flow is changed and the milk is flown into the main vessel.

The equipment according to the invention comprises fundamentally a flow director which is connected on the one hand to the collector of the milking machine and on the other hand to a by-tank and a main vessel respectively, and the function of which is directed by a control unit. The flow director is actually a valve or a tap which can be set from one position to the other and kept in the appropriate positions practically by means of an electro-magnet. Depending on the position of the valve or tap the milk arriving from the collector flows either into the by-tank or into the main vessel. A pair of electrodes are built in the inlet stud of the flow director—or in the milk-line connected to this—which sense the milk flow and give a start signal to the control unit. Likewise built into the inlet stud of the flow director are a source of light and a colour sensitive element, e.g. a photodiode. The function of the source of light and the photodiode is to check the colour of the milk and to send an appropriate signal to the control unit in case of any change in the colour of the milk. If the colour of the milk changes as a result of blood or pus the flow director must take up a position where the milk flows into the by-tank, and if the normal colour of the milk returns again, the control unit must set the flow-director in a position where the milk will get into the main vessel.

The control unit is expediently electronic equipment that can be operated from the mains, directly or by inserting a transformer assuring low voltage. At the start of the milk flow this control unit having short-circuited the mentioned electrodes assures the position of the flow director whereby the milk flows into the by-tank.

To assure maintenance of the position in the flowcontrol providing the initial flow direction for the predetermined length of time, the control unit comprises a time generator. Said time generator can be e.g. a stable time generator having a control adjustable in 0.5 sec stages. The control unit however can comprise a pulse counting unit, instead of the time generator, which may be e.g. adjustable in one-pulse stages. Stabilization of the start signal of the control unit must also be secured so that any malfunction arising from possible throb of initial milk flow is eliminated. This can be solved for example by a self-sustaining signal which begins with the appearance of the start signal and persists for a preset duration.

If the colour of milk flowing into the flow director differs from the normal colour, then the circuit of the already mentioned photodiode closes, bringing about as result of this a limitation signal for the control unit, whereby the position of the flow director determines a flow path leading the milk into the by-tank.

At the end of the initial machine milking period and in the presence of normal colour of milk the flow director takes up a position—remaining in the same position till the end of the milking—by which milk flows into the main vessel. At the end of machine milking as the flow of milk is ceasing, the circuit is interrupted at the electrodes sensing the milk flow and as a consequence the control unit ceases to function and automatically compensates itself, getting into a state ready for a new milking cycle.

The flow director—as already mentioned—can be an electromagnetically operated valve or tap, the construction of which may be any of a great variety.

Any known control unit is applicable if it is suitable for carrying out the outlined task. In principle there exists even the possibility of operating the flow director by e.g. a pneumatic construction instead of an electromagnet.

Thus the essence of the equipment according to the invention is that it comprises a flow director inserted into the milk-line starting at the collector of the milking machine, the flow director being connected to a by-tank through a by-pass stud, and is in connection with a control unit.

Figure 2:
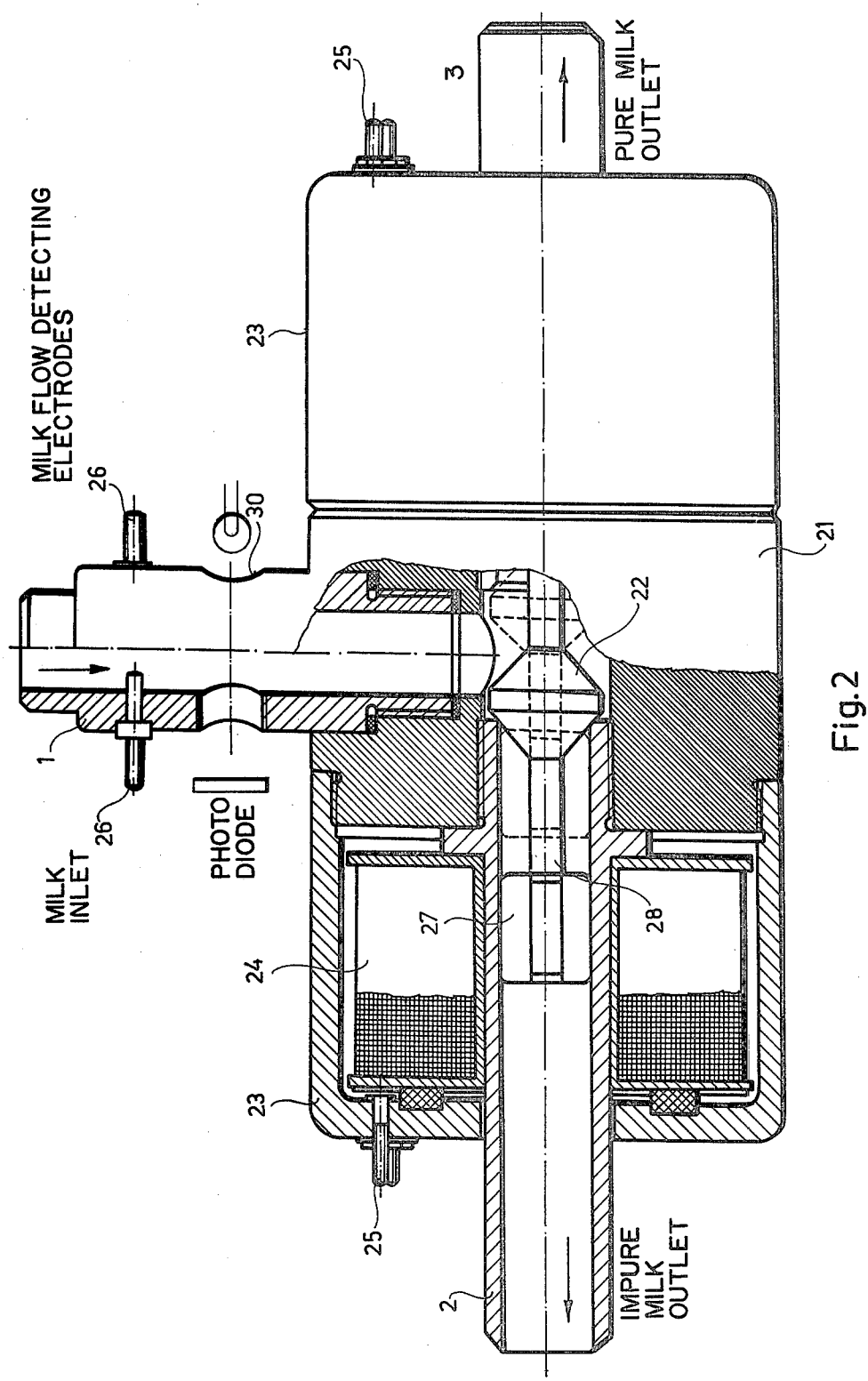

Details of the suggested equipment according to the invention are demonstrated in connection with an exemplary construction shown in the enclosed drawings. In the drawings:

FIG. 1 shows a circuit diagram of a milking machine equipped with a device according to the invention, and FIG. 2 shows an exemplary form of the flow director partially in section.

In the equipment shown in FIG. 1 a flow director 20 is inserted into the milk-line 8 comming from the collector of the milking machine by means of the inlet stud 1 of the flow director 20. The milking machine is not shown on the drawing; an outlet stud 3 of the flow director 20 is connected to milk-line 7 going to the main vessel 5. Bypass stud 2 of the flow director 20 is connected to the milk-line 9 going into the by-tank 4.

By-tank 4 is equipped with a drain-like 12, and another drain-line 13 is attached to the main vessel 5. The by-tank 4 and main vessel 5 are connected to a known machine providing vacuum by vacuum line 6. A pulser 10 is connected to the milking machine by a suction pipe 11. Adjoining the pulser 10 is an airpipe 18; said airpipe 18 can be in practice a simple aperture in the pulser.

The flow director 20 is connected to control unit 16 through control lines 14 and 15. Additional lines are also provided between control unit 16 and flow director 20, serving for conducting the start signal or the signal given by the photodiode, but for simplification these are not indicated on the drawing. Control unit 16 is connected to the energy source i.e. to the electric network or transformer by feed line 17.

FIG. 2 represents as an example a diagrammatical layout of the flow director 20 according to FIG. 1 partly in section. The body of the flow director consists of hub 21 comprising three threaded bores communicating with a central space. One of the threaded bores comprises an inlet stud 1 which is—in accordance with FIG. 1—connected to the collector of the milking machine by milk-line 8. The outlet stud 3 is situated in another threaded bore and connected to the main vessel 5 by milk-line 7. In the third threaded bore comprising bypass stud 2 is fixed and connected to a by-tank 4 through milk-line 9. Bypass stud 2 and outlet stud 3 are uniaxially arranged and their ends in hub 21 form valve seats. Valve body 22, is situated in the central space of the hub 21 surrounded by pipestuds, comprising two conical surfaces in the construction according to the example. One conical surface can be fitted onto the valve seat formed at the end of bypass stud 2, while the other cone surface forms a valve by collaborating with the valve seat formed at the end of the outlet stud 3. On the axis of the valve body 22 is arranged a rod 28 extending in both directions and at the ends of said rod 28 there are armatures 27 one for each end. Armatures 27 are made of ferromagnetic material, fitted into the pipe studs, for moving the valve body 22.

Bypass study 2 and outlet stud 3 are each surrounded by a magnet coil 24, covered by coil housings 23. Connectors 25 serve for switching the magnet coils 24 into the circuit.

In the inlet stud 1 electrodes 26 are fixed giving signal to the control unit 16 when short-circuited by milk.

Also in inlet stud 1 bores 30 are provided into one of which a light source shining into inlet stud 1 is fixed, while a colour sensitive element, suitably a photodiode is fixed in the other bore 30.

The operation of the equipment according to the invention is as follows.

The milking cups of the known milking machine are placed upon the udder nipples and then machine milking is started. When milk arrives into the inlet stud 1 of flow director 20 through milk-line 8 from the collector of the milking machine, it short-circuits the electrodes 26. The electrodes 26 give a start signal to the control unit 16 and this results in starting of the milking cycle program. For stabilizing the start signal self-maintenance is assured for e.g. 10 secs. to avoid any malfunction in the starting process of the control unit by possible throb of the first run of milk flow. According to the started program, control unit 16 produces a control signal in consequence of which the circuit of magnet coil 24, on the right side of FIG. 2, is closed. In this way the right-side armature 27—not shown in FIG. 2—and with it the valve body 22 move to the right and the valve body 22 abutting against the valve seat formed at the end of the outlet stud 3 closes the valve. The valve body 22 and the rod 28 pertaining to it as well as armatures 27 are then in the position shown in FIG. 2 by the dashed line. In this condition of the flow director 20 the milk flowing through the inlet stud 1 can pass only through bypass stud 2 and so, through the milk-line 9 into the by-tank 4.

After a preset length of time beginning with the start of the milking cycle program the control unit 16 gives a control signal in consequence of which the magnet coil to the left-hand side of FIG. 2 is energised and valve body 22 changes its position to that indicated by the solid line. In this position the opening of the bypass stud 2 is closed by valve body 22 and the milk is flowing from the inlet stud 1 into the outlet stud 3 and through this, and through the milk-line 7 into the main vessel 5. Under normal circumstances this flow line is secured to the very end of the milking cycle. As the milk-flow ceases, the short-circuited state of electrodes 26 also ceases and the automatic operation stops, and then balances itself. Thus the control unit prepares for the following milking cycle.

The part effecting the change-over in the control unit 16 can be a time generator or a pulse counter. In the case of a time generator it is expedient to afford possibility for setting the control in stages of 0.5 sec; while in the case of a pulse counter the setting of the control may be achieved in stages of one pulse.

The operation as described refers to cases where the colour of milk does not change during the milking cycle. If the colour of milk changes because blood or pus is present in it, then this change is sensed by a photodiode fixed in one of the bores 30 and brings about a limitation signal for control unit 16 resulting in either the prevention of valve body 22 taking up the position indicated on FIG. 2 by a solid line, or if the valve body 22 was already in this position, it gives a control signal causing return to the position indicated by the dashed line. As previously mentioned in connection with the position of the valve body 22 indicated by the dashed line, the milk can flow only into the by-tank 4, so the discoloured, that is bloody or purulent milk cannot get into main vessel 5. The position of flow director 20, directing the milk flow toward the by-tank 4, remains as long as discoloured milk passes in front of the photodiode in the inlet stud 1.

It can be seen on the basis of the description that the equipment discussed as an embodiment of the invention is quite simple, and there is no need to change the parts of the known milking machine system, only the insertion of a flow director and a control unit is necessary.

The equipment according to the invention is suitable for both types of milking machines i.e. with duct and with pail respectively, without the necessity to change the essence of the invention.

The collection of the milk separated at the beginning of the milking and also of the bloody and purulent milk into a by-tank enables the utilization of the contaminated milk after suitable treatment for feed purposes, thus the invention makes milk production more economical.

The main advantage of the invention however is that it decreases the specific germ count in the mixture-milk used for human consumption, and that the Coli-bacteria are almost totally eliminated from the mixture milk. All said advantages are accomplished without any supplementary power or labor.

What we claim is:

1. A process for milking a cow, comprising attaching milking apparatus to the cow and operating said apparatus to withdraw milk from the cow, diverting to a bypass tank for a predetermined time that portion of the milk which first flows from the cow, thereafter diverting the flow of milk from the cow to a main vessel, continuously colorimetrically monitoring the milk during its flow to said main vessel, and rediverting the milk from said main vessel to said bypass tank whenever the color of the milk changes from a predetermined color characteristic of healthy milk.

2. A process as claimed in claim 1, and re-diverting said milk to said main vessel when the color thereof changes back to said color characteristic of healthy milk.

3. A process as claimed in claim 1, in which said predetermined time is 3 to 10 seconds.

4. A process as claimed in claim 1, in which said milking apparatus is of the pulsing type, and said predetermined time is equal to the time required for 2 to 8 pulses of the milking machine.

5. Milking apparatus comprising means to withdraw milk from a cow, means to direct said milk to a main vessel, a bypass tank, means to divert said milk to said bypass tank during an initial predetermined period of flow of the milk from the cow, means continuously colorimetrically to monitor the milk, and means to divert the milk from said main vessel to said bypass tank when the color of the milk as colorimetrically monitored changes from a color characteristic of healthy milk.

6. Apparatus as claimed in claim 5, and flowsensing electrodes for determining the onset of milk flow thereby to start running said predetermined period of time.

* * * * *